June 10, 1941. K. D. McMAHAN 2,245,211
FLUID DYNAMIC CONTROL
Filed Aug. 14, 1937 2 Sheets-Sheet 1
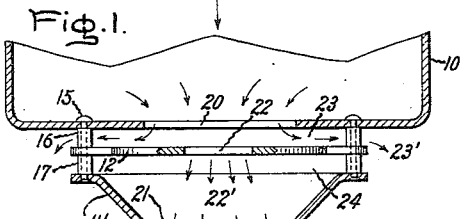
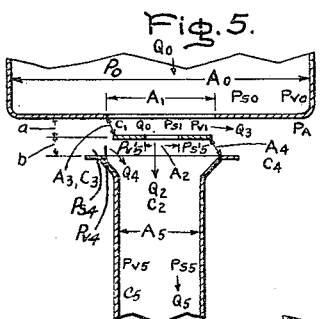
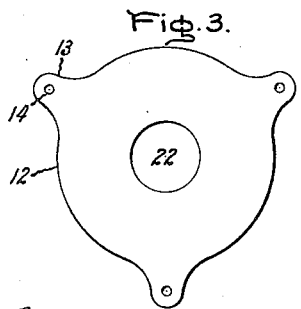
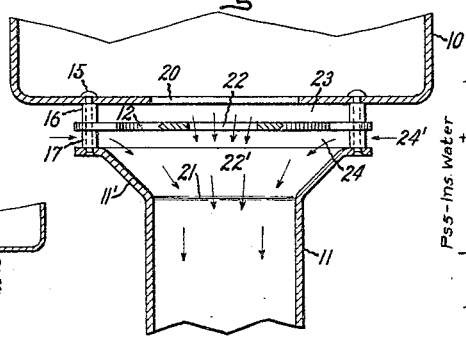
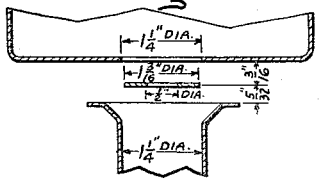
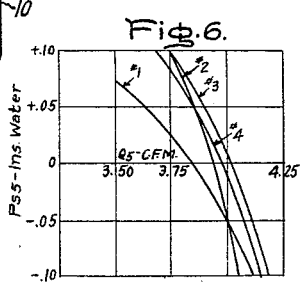
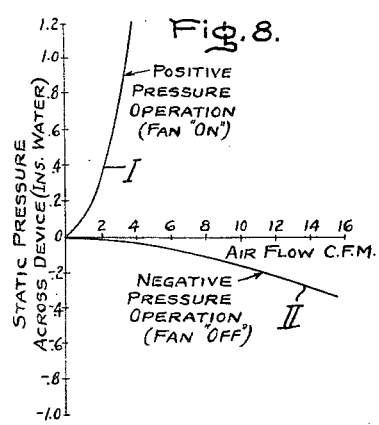
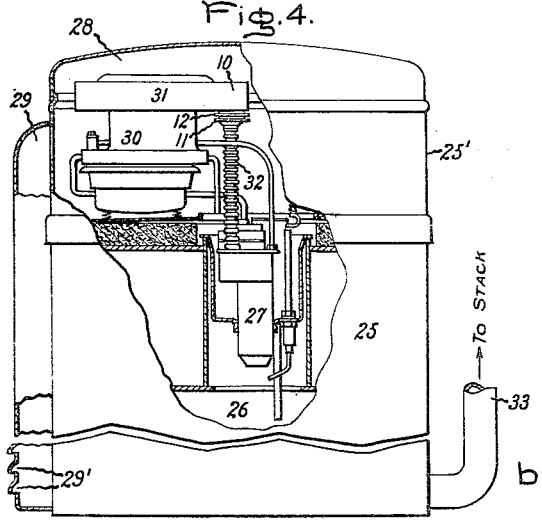
Inventor:
Kenton D. McMahan,
by Harry E. Dunham
His Attorney.

June 10, 1941.  K. D. McMAHAN  2,245,211
FLUID DYNAMIC CONTROL
Filed Aug. 14, 1937  2 Sheets-Sheet 2
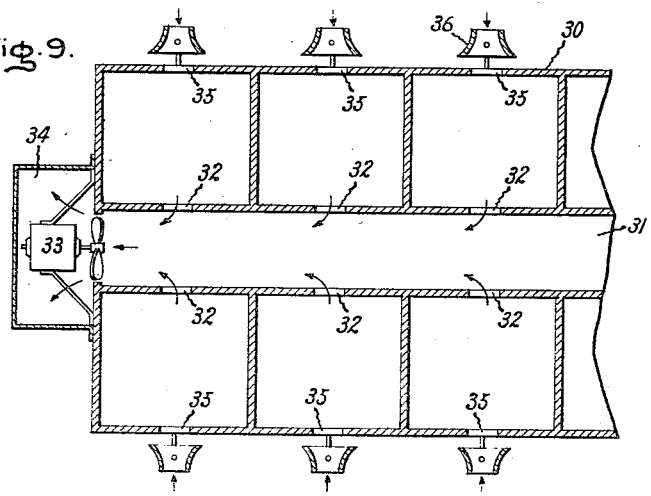
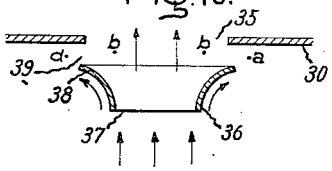
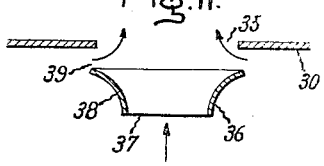
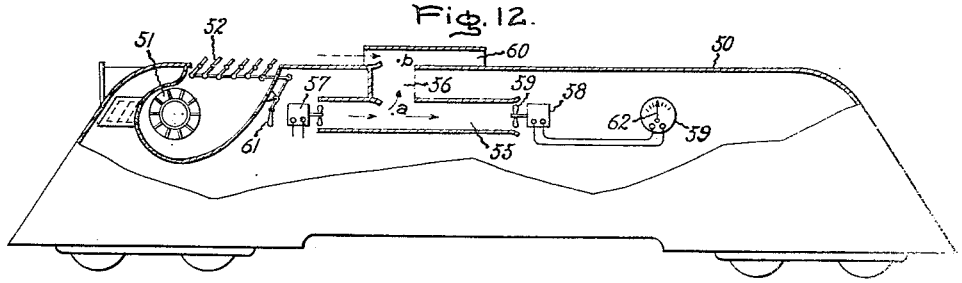
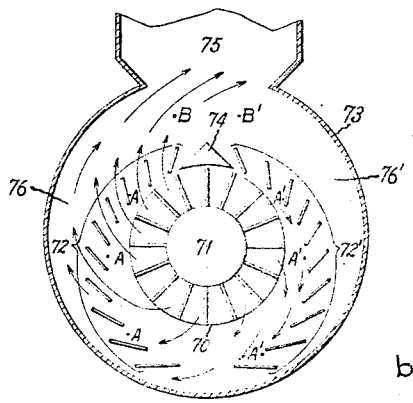
Inventor:
Kenton D. McMahan,
by Harry E. Dunham
His Attorney.

Patented June 10, 1941

2,245,211

UNITED STATES PATENT OFFICE 2,245,211

FLUID DYNAMIC CONTROL

Kenton D. McMahan, Schenectady, N. Y., assignor to General Electric Company, a corporation of New York Application August 14, 1937, Serial No. 159,137

5 Claims. (Cl. 137—111)

This is a continuation in part of my prior application, Serial No. 717,091, filed March 23, 1934.

The invention relates to fluid-dynamic control and has for its principal object improvements in methods and apparatus for controlling or regulating fluid flow without any moving parts such as valves or the like by utilizing the dynamics of the fluid itself.

More specifically, the principal object is to provide coordinated ejector actions of the fluid itself for controlling the flow of the fluid in apparatus having a fluid flow passage. These injector actions may be coordinated so as to provide for either different predetermined flow in the passage under different predetermined operating conditions, substantially uniform flow in the passage under different operating conditions, or substantially no flow in the passage under one predetermined condition and free flow in the passage under a different predetermined condition.

Another object is to provide an improved fluid flow system having specially formed and proportioned fluid-dynamic orifices and passages for furnishing high impedance to flow when one pressure differential is effective in the system and low impedance to flow when another pressure differential is effective in the system. In this way a valve-like flow control may be obtained with no moving parts other than the fluid itself so as to restrict or entirely stop flow of the fluid through a predetermined passage under one condition and permit relatively free flow of fluid through the passage under other conditions.

The present invention may be used with advantage in various forms of fluid flow control apparatus where such valve-like control is desired. To give a clearer understanding of the principles of the invention, several specific embodiments thereof are hereinafter described, namely, the variable air supply control system for a furnace of my prior application, a constant flow room ventilating system independent of wind conditions, a combined wind velocity and railway car speed louver control indicator system, and a centrifugal type blower construction providing for efficient operation in either direction.

Insofar as is known to me at present the operation of my improved fluid dynamic control involves the principles stated by Bernoulli's theorem for conservation of energy. This theorem implies a low pressure where the fluid velocity is high and a high pressure where the fluid velocity is low. Hence, near the discharge of a jet or rapidly moving stream of fluid, a low pressure exists which tends to entrain or inject adjacent fluid into the jet. In accordance with my invention the flow control apparatus is provided with a flow passage and means for subjecting the flow passage to two such jets, issuing from a common source or different sources, and discharged in such proximity to the inlet and outlet of the passage that each jet tends to eject fluid from the passage. If desired, this may result in a regulated flow through the passage between jets with the magnitude of flow equalizing the ejector action of the two jets. However, if the combined action of one jet plus its external reactions is made to balance the combined action of the other jet, the resultant flow between jets will become zero. In one form of my improved flow control apparatus one of these jets, which I will designate the main flow, is directed into a conduit or fluid receiving means into which the flow is desired to be controlled. This main flow may be supplemented by the auxiliary flow consisting of the resultant flow between the jets as above explained, or the jets may be so balanced that no auxiliary flow will exist since this resultant flow may be made zero. In other words, one of the jets may be made to act under certain conditions as an impedance to supplementing of the main flow by the injector action of the main flow.

In order that the scope of my invention may be more clearly understood, I have elected to describe several specific examples thereof wherein the cooperating jet action as above described is made use of. In the first example the invention is applied to control the supply of primary air to the nozzle of an oil furnace of the type shown in Patent No. 1,992,794. The invention may be applied, however, in any similar air supply system for which the following or similar characteristics are desired:

1. High impedance to flow actuated by positive pressure (pressure above atmospheric), or to pushing the substance through the device.

2. Very low impedance to flow actuated by negative pressures (pressures below atmospheric), or to sucking the substance through the device.

It will be assumed that the primary air system of the oil furnace has the following requirements for satisfactory operation:

1. The air flow in the primary air system during operation of the furnace must not vary more than ±6% with variations of stack draft of ±.10" of water.

2. The air flow in the primary air system immediately after shutdown of the furnace must be at least 75% of the normal flow during operation.

3. The control of the flow of air must be secured by means of an automatic device having no moving parts.

A furnace air supply control device may be constructed in accordance with my invention to have such high impedance to positive pressure and such low impedance to negative pressure as to satisfactorily meet the above outlined requirements. Such a control device may be inserted between the discharge opening of the high pressure air supply means of the furnace and the inlet end of the primary air supply conduit. In such embodiment of my invention the furnace air supply device includes a thin control plate placed in spaced relation to both the discharge opening of the high pressure supply means and the inlet opening of the conduit. In the plate in alinement with both of said openings is an orifice which permits the passage into the inlet end of the conduit of a predetermined portion of the air discharged from the high pressure supply means. The size of this orifice is less than that of the discharge opening and serves to regulate the main primary air flow within predetermined narrow limits during operation of the furnace when the air is forced through the device under positive pressure. Since the orifice in the plate is smaller than the discharge opening of the high pressure air supply means, a portion of the high pressure discharge from the latter will be deflected outwardly into the atmosphere in the form of a secondary jet on the side of the plate away from the conduit inlet. The main jet discharge through the plate orifice will tend to draw air from the secondary jet and the surrounding atmosphere into the inlet end of the conduit on the side of the plate adjacent the conduit inlet. The plate may be located, as hereinafter pointed out, so that the action of the secondary jet will exactly balance the action of the main jet plus external reactions whereby no resultant flow will occur from the atmosphere into the conduit while air is being forced through the device under positive pressure. Immediately upon "shutdown" of the furnace the high pressure device ceases to force air through the device and the secondary jet no longer exists to impose impedance to flow from the surrounding atmosphere into the inlet of the conduit. In other words, the effective area of the inlet is enlarged so that the flow of air through the furnace air supply conduit under a low negative pressure or suction will not be reduced in proportion to the reduction in pressure drop across the system.

The invention will be better understood from the following detailed description taken in conjunction with the accompanying drawings in which Figs. 1 and 2 show diagrammatically a preferred form of furnace air supply control device embodying the invention and include arrows to designate the direction of fluid flow through the device when actuated respectively by positive fluid pressure and by negative fluid pressure. Fig. 3 is a plan view of the flow control plate, and Fig. 4 is a partially cut away view of an oil furnace showing the manner of incorporating the improved air control device therein. Fig. 5 is a diagrammatic representation for aid in an understanding of the theory and calculations pertaining to the furnace air supply device; Fig. 6 is a diagrammatic representation of a pressure flow curve for determining the dimensions of the device; Fig. 7 is a diagrammatic representation giving the dimensions of a furnace air supply device constructed in accordance with my invention; Fig. 8 is a reproduction of the performance curves of the device so constructed; Fig. 9 illustrates diagrammatically an embodiment of the invention in a building ventilating system wherein the flow through each room is maintained substantially constant irrespective of wind velocities and direction; Figs. 10 and 11 are enlarged diagrams illustrating by arrows the air flow into a room of the ventilating system shown in Fig. 9 under different wind conditions; Fig. 12 illustrates an embodiment of the invention in a railway train louver control system responsive jointly to train speed and relative wind velocity, and Fig. 13 illustrates an embodiment of the invention in a centrifugal blower capable of operating efficiently in either direction.

Referring to Figs. 1 and 2, 10 represents a portion of the casing of a blower such as that employed in the furnace illustrated in Fig. 4, but may represent any device for supplying air under pressure or an outlet conduit from such device and the operation of which may be varied in any suitable manner to produce two different pressure values. 11 represents a conduit or the like for receiving air from the blower and having an inlet 21 provided with an outwardly flared wall 11' extending therefrom. Interposed between the blower casing 10 and the inlet 21 of the conduit is a flow control plate 12 having projections 13 provided with holes 14 through which may be passed screws or rivets 15 for securing the plate 12 and the conduit 11 to the casing 10. Surrounding the rivets 15 are spacers 16 and 17 which respectively serve to hold the plate a predetermined distance from the casing and the flared wall 11' of the conduit a predetermined distance from the plate 12 to form a flow passage 24 as hereinafter pointed out.

The wall of the casing 10 is provided with a discharge opening or orifice 20 of a predetermined size for controlling the issuance of air from the high pressure supply means. In alinement with the discharge opening 20 is the inlet opening 21 of the conduit 11. Plate 12 is provided with an orifice 22 in alinement with openings 20 and 21 to form a strait passage for the flow of air between casing 10 and the conduit 11. Orifice 22 is smaller than discharge opening 20 and its size is calculated in a manner hereinafter set forth to control within predetermined narrow limits the flow of air through the strait passage provided by the alined openings 20, 21 and 22 between casing 10 and conduit 11 under positive pressure conditions.

Since the orifice 22 is smaller than the opening 20, a portion of the air discharged from the latter opening will be deflected outwardly through the lateral passage 23 between the casing and the plate in the form of a jet 23'. The remainder of the air so discharged will pass through the restricted orifice 22 in the plate and will be directed thereby in the form of a jet 22' into the inlet opening 21.

In accordance with the theory previously outlined, the action of the jets 22' and 23' may be balanced by proper adjustment of the size of the lateral passage 23, which is determined, by the length of spacers 16, so that there will be no flow of fluid through the passage or conduit 24 between the plate 12 and the flared wall 11' under a given set of positive pressure conditions producing discharge of fluid through orifice 22. The action is such that the jet 23' produces a suction at the outer or inlet end of the passage 24 and the jet 22' produces a suction at the inner or discharge end of the passage 24. With proper adjustment the two suction pressures plus any external pressures are made equal and opposite so that flow through passage 24 is blocked off. Thus it will be seen that under a given set of positive pressure conditions producing discharge of fluid through orifice 22, the flow of air from the casing 10 into the conduit 11 may be limited entirely to a restricted or controlled flow through the strait passage including orifice 22.

The member 11 furnishes means for attachment to a furnace air supply conduit or the like upon the outlet end of which may be imposed a negative pressure by some means such as the furnace stack draft. Now upon shutdown of the blower or the like positive pressure producing means, there will no longer be any jet 23' and flow through passage 24 due to the suction imposed thereon will be unimpeded. There will result a flow 24' in the direction of the arrows as shown in Fig. 2, the volume of which flow will be determined by the negative pressure or suction imposed and the size of the passage 24, which is set by the length of spacers 17. The overall effective flow area comprising the areas of both the orifice 22 and the passage 24 under negative pressure conditions will be considerably larger than the effective flow area comprising only the area of orifice 22 under positive pressure conditions, so that even though the pressure drop available across the device is substantially reduced by shutdown of the positive pressure producing means, the volume of flow in conduit 11 will not be correspondingly reduced and may be maintained at almost any desired value. The reduced flow through orifice 22 will be supplemented by the inflow of air through passage 24 from the atmosphere surrounding the device. It will be seen that the chief advantage of this device is the production of results similar to those of an automatic control valve, but with no moving parts.

Fig. 4 shows diagrammatically the manner of incorporation of my improved flow control device in an oil furnace of the type described in the previously mentioned Patent No. 1,992,794. The furnace 25 has a combustion chamber 26 to which is fed a combustion mixture of fuel and air by means of burner nozzle 27. The upper portion of the furnace provides a compartment 28 which may be connected with atmosphere or other source of air in any suitable manner as by means of duct 29 and louvers 29' and in which compartment is disposed the fuel and air supply means 30 which includes a blower 31 for supplying air under pressure to the nozzle through the articulated air supply conduit 32. The essential parts of the flow control device are shown at 10, 11 and 12, the casing 10 in this case being a portion of the blower housing, and the articulated conduit 32 being secured to the conduit 11 of the device. A pipe, a part only of which is shown at 33, is provided for conducting combustion products from the combustion chamber to a stack (not shown), which stack when hot will be operative in a well known manner to induce a draft through the furnace. When the operating conditions including the pressure drop from blower to combustion chamber and volume of air required for combustion and cooling of the nozzle are known, the size of the orifice 22 can be made to permit only this volume of air to flow therethrough under positive pressure conditions and to permit only limited variations therein due to irregularities in stack draft. Passage 23 will be made of such size that it will discharge a jet of such volume and in such proximity to the outer end of the passage 24 as to substantially block off any flow through the passage 24 over the operating range of the furnace. Upon "shutdown" of the furnace the blower will no longer force air through the flow control device and the blocking action will cease. The passage 24 will be of such size that with the pressure made available in the combustion chamber by the stack draft pressure existing in the passage 33 immediately after "shutdown," the desired volume of air will be sucked in through passage 24 and also to a minor extent through the passage including orifice 22 to cool the nozzle and prevent damage due to heat in the combustion chamber until the furnace cools down.

The equations for determining the operation of the flow control device under negative and positive pressure conditions may be easily calculated by consideration of the various areas and their respective flow coefficients, the pressure drops and certain reasonable assumptions. Referring to Fig. 5, $A_0$, $A_1$ etc.=areas of the various orifices in sq. ft.
$P_{v0}$, $P_{v1}$ etc.=velocity heads at various points in inches of water
$P_{s0}$, $P_{s1}$ etc.=static heads at various points in inches of water.
$Q_1$, $Q_2$ etc.=flow at various points in cu. ft. per min. (C. F. M.)
$C_1$, $C_2$ etc.=orifice coefficients of the various openings
$\rho$=density, or specific weight, of the medium in lbs. per cu. ft.
$a$ and $b$=spacings in inches of the plate with respect to the high pressure supply means and the conduit respectively.

The following reasonable assumptions are made:

(1) The spacings $a$ and $b$ are arranged so that under the positive pressure condition, the injector action of the jet $Q_3$ just balances the combined injector action of $Q_2$ plus the effect of the static pressure $P_{s5}$.

(2) The area $A_0$ is large as compared to $A_1$ so that $P_{v0}$ may be neglected.

(3) The area $A_3$ is also small as compared to $A_1$.

(4) Under negative pressure conditions the effect of the orifice $A_1$ may be neglected.

(5) The pressure of the medium surrounding the device is assumed to be atmospheric and all other pressures are considered relative thereto.

The fundamental formulae used as the basis for the calculations hereinafter set forth will be clearly understood by one skilled in the art and may be found, along with the manner of deriving the same, in any of the standard treatises on hydraulics and fluid flow, such for example as that to be found in Baumeister's book on "Fans" (McGraw Hill 1935) pages 166–170 inc. Only sufficient of the standard derivations will be given briefly herein as will insure a full understanding of the formulae employed.

The well known expression for free spouting velocity of a fluid medium is (1) $$v = \sqrt{2gH}$$

wherein $v$ represents velocity in ft. per sec.; $g$, the gravitational acceleration constant=32.2 ft. per sec.²; and $H$, the head in ft. of the fluid.

In order to determine the equation for quantity of fluid flow from an orifice, the orifice coefficient and area are introduced into the above equation which becomes (2) $$Q = A \times v = CA\sqrt{2gH}$$

which may be converted, employing the more useful units of practice, to the form (3) $$Q = 1095 CA\sqrt{\frac{h}{\rho}}$$

wherein, as set forth hereinbefore, Q=quantity of fluid flow in cu. ft. per min. (C. F. M.); C= orifice coefficient, A=area in sq. ft., $h$=head in inches of water and $\rho$ is the density, or specific weight, of the fluid medium in pounds per cu. ft.

From Equation 3 it will be seen that the flow through orifice $A_2$ may be expressed by the equation (4) $$Q_2 = 1095 C_2 A_2 \sqrt{\frac{P_{s1} + P_{v1} - P_{s'5}}{\rho}}$$

since the head ($h$) across orifice $A_2$ is equal to the static head ($P_{s1}$) and the approach velocity head ($P_{v1}$) on the upstream side of the orifice minus the static head ($P_{s5}$) on the down stream side of the orifice.

Then, from assumption 1, above, under positive pressure conditions $$Q_4 = 0$$

so that $$Q_2 = Q_5$$

and also, at the center of jet $Q_1$, bearing in mind assumptions 2 and 3, $$P_{s1} + P_{v1} = P_{s0}$$

Therefore, with substitution of these quantities in Equation 4, the equation for positive pressure operation is found to be (5) $$Q_5 = 1095\ C_2 A_2 \sqrt{\frac{P_{s0} - P_{s'5}}{\rho}}$$

The expression ($P_{s0} - P_{s'5}$) is the pressure drop across the entire device and from Equation 5 may be found in terms of flow at the discharge end and the area of orifice $A_2$. The area $A_2$ may be determined for any value of ($P_{s0} - P_{s'5}$) as soon as the desired volume of the flow $Q_5$, the density of the fluid, and the shape of the orifice $A_2$ are known. It will be assumed that the control orifice $A_2$ will be of the sharp-edged type which has a coefficient of approximately 0.62. Therefore, $C_2$ will equal 0.62, and the density of air, which is the fluid medium for which the illustrated embodiment of the invention is designed, under standard conditions (29.9″ Hg. and 70° F.) is .07488 lbs./Ft.³.

For negative pressure conditions, an equation for $Q_5$ may be derived in the same manner as that outlined in the derivation of Equation 4 and becomes (6) $$Q_5 = 1095\ C_5 A_5 \sqrt{\frac{P_{s'5} + P_{v'5} - P_{s5}}{\rho}}$$

Also, since under negative pressure conditions $Q_4$ is no longer blocked off by the injector action, making $$Q_5 = Q_2 + Q_4$$

while $$Q_2 = 1095\ C_2 A_2 \sqrt{\frac{P_{s1} + P_{v1} - P_{s'5}}{\rho}}$$

and $$Q_4 = 1905\ C_4 A_4 \sqrt{\frac{P_{s4} + P_{v4} - P_{s'5}}{\rho}}$$

then an alternative equation for the value of $Q_5$ is found to be (7) $$Q_5 = 1095 \left( C_2 A_2 \sqrt{\frac{P_{s1} + P_{v1} - P_{s'5}}{\rho}} + C_4 A_4 \sqrt{\frac{P_{s4} + P_{v4} - P_{s'5}}{\rho}} \right)$$

Further, it may be assumed without introduction of appreciable error, that under negative pressure conditions $P_{v'5}$, $P_{s4}$, $P_{v4}$, $P_{s1}$ and $P_{v1}$ all are equal to zero so that Equation 6 may be reduced to (8) $$Q_5 = 1095 C_5 A_5 \sqrt{\frac{P_{s'5} - P_{s5}}{\rho}}$$

and Equation 7 may be reduced to $$Q_5 = 1095 (C_2 A_2 + C_4 A_4) \sqrt{\frac{-P_{s'5}}{\rho}}$$

Solving Equations 8 and 9 simultaneously to eliminate $P_{s'5}$ gives

(10) $$Q_5 = \sqrt{-\frac{1095\sqrt{P_{s5}}}{\left[\frac{1}{C_5^2 A_5^2} + \frac{1}{(C_2 A_2 - C_4 A_4)^2}\right] \rho}}$$

which is the equation for negative pressure operation.

The area $A_2$ is determined by the positive pressure conditions and may be calculated from Equation 5 since the value of $Q_5$ under positive pressure (which is the desired flow through the system) and the pressure drop ($P_0 - P_{s5}$) across the system are known. Equation 10 gives the flow under negative pressure as a function of the pressure in the conduit, the various areas, the density of the medium, and the orifice coefficients. $A_2$ is calculated as above pointed out. $A_5$ and $A_4$ may be varied to give any desired characteristics under negative pressure conditions. From a consideration of the volume of flow desired under negative pressure conditions, the areas $A_5$ and $A_4$ may be calculated in a well known manner keeping in mind that under negative pressure conditions the available pressure drop will be equal to the stack draft pressure only. The values of $C_5$ and $C_4$ are known from the design of openings $A_5$ and $A_4$. When the areas $A_4$ and $A_5$ are determined for the negative pressure conditions they will remain fixed, the area $A_5$ being that of the cross section of the supply conduit and the area $A_4$ being fixed by the length of spacing $b$. The area $A_2$ will remain fixed by the requirements for the positive pressure conditions. The only value left to determine is the area $A_3$ which will be necessary to provide the required balance, as set forth in assumption (1), of the jets under positive pressure conditions. This value $A_3$ must be determined by tests which may be simple cut and try methods in which the two jets $Q_3$ and $Q_2$ are balanced at the value of $P_{s5}$ at which the device is intended to operate. Let us assume that it is required to have the jets balance at $P_{s5} = +.05$ inch of water with $P_{s0} - P_{s5} = 1.1$ inches of water. This is done by the following steps:

(1) Leaving the area $A_4$ unblocked and using any reasonable value of $A_3$, obtain a curve of $Q_5$ vs $P_{s5}$ over a range of pressures both positive and negative while maintaining $P_{s0} - P_{s5} = 1.1$ inches of water.

(2) Plot the result of (1) in curve form ($P_{s5}$ vs $Q_5$) as indicated by curve #1 of Fig. 6.

(3) Physically block off the area $A_4$ and run another series of tests to plot another curve $Q_5$ vs $P_{s0}$ such as that shown as #2 of Fig. 6.

(4) Curve #1 crosses curve #2 at $P_{s5}=-.05$ which indicates that the jets are balanced and $Q_4=0$ at $P_{s5}=-.05$ with the spacing $A_4$ as set. The ejector action of $Q_3$ is therefore too great for the case considered and $A_3$ must be reduced.

(5) With $A_3$ reduced repeat as before to get another curve of $Q_5$ vs $P_{s5}$ which curve will be similar to that shown as #3 on Fig. 6. It will be seen that this curve #3 crosses curve #2 at $P_{s5}=0.1$.

(6) The ejector action of $Q_3$ is now too small and $A_3$ must therefore be increased. By several such trials the area of $A_3$ may be found which will produce a curve $Q_5$ vs $P_{s5}$ such as shown at #4 which crosses #2 at $P_{s5}=+.05$. This is the required area $A_3$.

Fig. 7 shows the actual dimensions, calculated as above outlined, of a device designed for use in the primary air supply system of an oil burner. In these calculations the value of $Q_5$ was fixed by the volume of air required for combustion and for cooling of the nozzle during operation of the particular furnace. The value of $Q_5$ under negative pressure conditions was assumed to be 75% of the value of $Q_5$ under positive pressure conditions. The pressure imposed upon the outlet end of the conduit by the stack draft immediately after shutdown was found to be $-.10$ inch of water. It was also assumed that under positive pressure conditions the primary air flow $Q_5$ through the device should not vary more than ±6% with a pressure drop across the device of 1.1±0.1 inches of water. It will be understood that under positive pressure operating conditions the static pressure $P_{s0}-P_{s5}$ cannot be maintained constant at 1.1 inches of water due to variations in the stack draft. A pressure of $+.05$ inch of water was arbitrarily selected as the mean pressure $P_{s5}$ during operation and the flow control device was designed so that there would be an absolute balancing of the jets when this pressure equals $+.05$. The variations in pressure on either side of this value due to variations in stack draft will not be sufficiently great to seriously disturb the balance of the jets during positive pressure operation.

To determine the efficiency of operation of the device diagrammatically shown in Fig. 7, a series of tests were run to secure data for the plotting of the curves shown in Fig. 8. First the operation of the blower of the oil furnace was varied to impose different values of positive pressure upon the device and the corresponding values of flow were noted. From these values curve I was plotted. The blower was then shut off and different values of negative pressure were imposed upon the device and the corresponding values of flow noted from which values the curve II was plotted. From a comparison of these two curves it will be seen that the volume of air flowing through the device under a certain value of negative pressure is appreciably larger than the volume which would flow through the device under an equivalent value of positive pressure.

It is to be understood that the method previously outlined for calculating the dimensions of the device to effect a balance of the jets $Q_2$ and $Q_3$ so that the auxiliary opening $A_4$ will be completely blocked off, will apply equally well whether, under the particular positive pressure operating conditions assumed, the value of $P_{s5}$ is greater or is less than the atmospheric pressure $P_A$ surrounding the device. Likewise the same principles will apply when all values of pressure are above atmospheric but in the same relation as herein outlined. In other words, a certain value of positive pressure may be assumed which would correspond to atmospheric pressure. The device therefore can be designed to impose a high impedance to any flow through the device caused by pressures greater than the assumed pressure and a lower impedance to any flow caused by pressures lower than the assumed pressure. This may be more clearly understood when it is borne in mind that in the absolute system of pressures, atmospheric pressure is a positive value and suction pressures are merely lower positive pressures when compared to atmospheric.

It will further be seen that the device can be so designed in accordance with my invention that the jet $Q_3$ will impose a varying blocking action rather than a substantially complete blocking action over the operating range. In other words, referring to Fig. 6, the value of the quantity $A_3$, determined by the spacing $a$, may be so set that for that particular operating range the device will have a characteristic curve similar to either #1 or #3 rather than one similar to #2 wherein complete balance occurs within the operating range.

Fig. 9 shows an embodiment of the invention in a building ventilating system for maintaning a substantially constant flow of air through the several rooms irrespective of the outside wind velocity and direction. All of the rooms shown in the building 30 are connected to a common central ventilating duct 31 by suitable openings 32. The exhaust fan 33 draws the air from the duct 31 and discharges it preferably through a vertical outlet or duct 34 which may extend up the outside walls of the building. Ventilating air is admitted to each room through an opening 35. Each of the openings 35 is provided with a fluid dynamic flow control baffle 36 located in spaced relation with the opening 35 in order to eliminate the effect of the outside wind upon the flow of ventilating air through the opening 35.

Fig. 10 indicates by the arrows the fluid dynamic flow control action occurring when a high wind is directed against the baffle 36. The baffle 36 has a restricted central orifice 37 through which only a part of the wind can pass into the ventilating opening 35. The curved sides 38 of the baffle deflect the wind adjacent the passage 39 formed between the walls of the ventilating opening 35 and edge of the baffle and thereby set up an injector action tending to produce a flow outwardly from the room through this passage 39. This injector action may become greater than the injector action produced by the flow of the wind through the orifice 37 and tending to draw air through passage 39 into the ventilating opening 35 under extremely high velocity wind conditions. The size of the orifice 37 preferably is made such that under average wind conditions the amount of air admitted to the ventilating opening 35 is substantially the same as that drawn through the opening 35 by suction of the fan 33 when there is no wind.

Fig. 11 indicates by the arrows the flow conditions obtaining when there is no wind and the flow through the ventilating opening 35 is produced entirely by the ventilating fan 33. Under these conditions the negative pressure or suction produced by the fan 33 draws air through the orifice 37 in the baffle 36 as well as through the passage 39 provided between the edge of the baffle 36 and the walls of the building 30 around the ventilating opening 35. The form of the invention illustrated in Figs. 9, 10 and 11 is particularly advantageous for use in a building where chemical processes involving the release of fumes or vapors are carried on in the various rooms. Under such circumstances the invention insures that substantially uniform ventilation is provided for all of the rooms under varying wind conditions.

An embodiment of the invention in a high speed railway car louver control is shown in Fig. 12. While not shown in the drawings, the car 50 is propelled by an oil fired steam turbine apparatus having a condenser for the steam cooled by operation of the blower 51. The flow control louvers 52 are provided for obtaining the maximum output of the blower 51 under varying operating conditions. When the car is at standstill, the louvers are operated to a vertical position so as to obtain a minimum resistance to the flow of air but when the car is under way the louvers must be inclined rearwardly in order to obtain the minimum resistance to the flow of air from the blower 51. The inclination of the louvers 52 also varies with the relative wind direction and velocity in order to obtain the maximum output from the blower 51. The present invention enables the proper setting of the louvers 52 to be obtained under these varying conditions.

As shown diagrammatically in Fig. 12 the louver control embodiment of the invention consists of a flow passage 55 interconnected with the flow passage 56 in such a way that an injector action is set up tending to produce flow from the passage 56 into the passage 55 upon flow in the passage 55. A motor driven fan 57 is provided for setting up the flow in the passage 55. This fan 57 may be operated at constant speed or preferably is so connected as to operate at the same speed as the blower 51. An electric generator 58 is driven by a wind propeller 59 located in the passage 55 to be responsive to the flow therein. The generator 58 is connected to a speed responsive electrical indicating instrument 59 which is calibrated in degrees or settings corresponding to the inclination settings of the louvers 52.

On top of the car 50 a flow passage 60 is provided communicating with the passage 56. The air flow through passage 60 depends jointly upon the speed of the car 50 and the relative wind velocity and direction. The operation is as follows. When the car 50 is at standstill and there is very little or no flow in the passage 60 due to outside wind, the motor driven fan 57 produces a flow in the passage 55 which sets up an injector action at the point $a$ tending to draw air from the passage 56 into the passage 55. The wind propeller 59 then drives the generator 58 at maximum speed so as to give an indication that the louvers 52 should be set in the maximum vertical position. The setting of the louvers 52 may be accomplished by means of the mechanical hand lever 61 or, if desired, any standard form of automatic motor driven followup louver control responsive to the position of the indicating element 62 of instrument 59 may be provided if desired.

As the car 50 starts and increases its velocity or as the outside wind velocity increases, the flow through the passage 60 correspondingly increases. This produces an injector action at the point $b$ in opposition to the injector action at the point $a$ thus decreasing the flow through the passage 56 into passage 55. As a result the propeller driven generator 58 decreases its speed and the indicating element assumes a different position to indicate that the position of the louvers 52 should be changed correspondingly. When maximum car speed or wind velocity conditions occur, the injector action at point $b$ will predominate over that at point $a$ thereby causing air to flow into the passage 56 from the passage 55. This further reduces the speed of the propeller driven generator 58 to the minimum value with a corresponding movement of the indicating element 62 to the minimum position.

An embodiment of the invention in a reversible blower is illustrated in Fig. 13. The rotor 70 of the blower is shown as of the radial vane type and is driven by a reversible motor not shown. In case a greater capacity in one direction of rotation than in the other is desired, the rotor blades may be inclined accordingly. The rotor 70 has an axial air inlet 71. A series of overlapping spirally disposed vanes or baffles 72 and 72' are fixedly located on each side of the rotor 70 to form in conjunction with the enclosing casing 73 a reversed scroll for rotation of the rotor 70 in opposite directions. A double cutoff element 74 is located adjacent the periphery of the rotor 70 opposite the outlet 75 of the casing 73. The outlet 75 may be connected to ventilate the motor driving the rotor 70 or for any other desired purpose.

In operation when the rotor 70 is driven in the clockwise direction, air is drawn to the axial inlet opening 71 and is projected radially outwardly through the rotor 70 with a clockwise swirl as indicated by the arrows. The air impinges upon the series of blades or baffles 72' which act jointly as an impervious scroll wall inside of the casing 73. Due to the relative inclination and spacing of the vanes with relation to the direction of air flow an injector action is set up at points A' between the vanes tending to draw air from the passage 76' between the series of blades 72' and the right-hand side of casing 73. The impingement of the high velocity stream of air projected from the rotor 70 upon the series of blades or baffles 72' produces an injector action between the blades tending to draw fluid through the vanes. However, this injector action is balanced by an opposing injector action as will be explained hereinafter so that no flow occurs through the vanes.

The series of blades or baffles 72 are so spaced and related that the clockwise whirl of air produhced by the rotor readily passes therethrough with a minimum of resistance to the flow. The clockwise stream of air is then projected between the cutoff piece 74 and the left-hand edge of the outlet opening 75 at relatively high velocity. This high velocity stream of air sets up an injector action effective at the point B' to balance or neutralize the sum of the injector actions set up at points A' between the vanes or baffles 72', thereby preventing any recirculation of the clockwise swirl of air through the blower. This materially increases the efficiency of operation of the blower.

Upon operation of rotor 70 in the counterclockwise direction, the series of blades or baffles 72 serve jointly as an impervious wall to restrain the counterclockwise whirl of air projected from the rotor 70 while the series of blades or baffles 72' permit ready flow of the counterclockwise whirl of air therethrough. The rapidly moving counterclockwise stream of air sets up an injector action at the points A adjacent the inner edges of the series of blades or baffles 72 tending to draw air from the passage 76 between the blades or baffles 72 and the left-hand side of the casing 73. However, the main counterclockwise stream of air readily passes through the series of vanes 72' and is projected between the cutoff element 74 and the right-hand edge of the outlet 75 thereby setting up an opposing injector action at the point B which prevents any flow of air due to the injector action at the point A. This prevents recirculation of the counterclockwise stream of air inside the casing 73.

From the description of the several embodiments of the invention it will be apparent that the invention can be used in various forms and for various purposes. It should be noted that the common characteristic in all forms is the provision of two opposing injector actions which serve by the dynamics of the fluid itself to control the flow of fluid through a passage which is subject to both of the injector actions. When the two injector actions are balanced as in the furnace air supply mechanism shown in Figs. 1 to 8 or in the reversible fan shown in Fig. 13, the flow through the passage is effectively blocked or neutralized. This is also true under certain predetermined conditions in the building ventilating system shown in Fig. 9 as well as in the car louver control system shown in Fig. 12. However, it is not always necessary that the injector actions exactly balance each other and either one may predominate over the other under different operation conditions.

The device constructed in accordance with my invention will function equally well, bearing in mind its fundamentals of operation, if the fluid which it is desired to control is other than air or if the auxiliary source of fluid surrounding the device is other than atmosphere.

For the reasons above set forth it is clear that my invention is subject to numerous modifications and I do not desire to be limited to the specific embodiment or application of the device herein set forth as an example. The features which I believe to be novel are set forth in the following claims.

What I claim as new and desire to secure by Letters Patent in the United States is:

1. In a fluid dynamic control system, the combination of a fluid suction device having an inlet opening, a fluid discharge device having an orifice in opposing spaced apart relation with said inlet opening, and a baffle having a restricted orifice disposed between said orifice and said inlet opening to provide a passage at one side thereof for fluid flow into said inlet opening in the absence of fluid discharge from said orifice and to divert a predetermined portion of the fluid discharge from said orifice when there is a discharge from said fluid discharge device on the other side thereof with an ejector action tending to draw fluid outwardly through said passage, and for admitting a predetermined portion of fluid discharge from said discharge orifice through said restricted orifice into said inlet opening with an ejector action on said passage opposing said first ejector action.

2. In combination with fluid suction means having an inlet opening subject at times to an independent relatively high velocity fluid flow towards said opening, of a baffle providing a passage between the inlet opening and the adjacent side of the baffle for relatively unrestricted fluid flow into said opening through said passage and having an orifice in the baffle disposed in front of said inlet opening for admitting a predetermined portion of said high velocity fluid flow into said inlet opening in the form of a jet discharge having an injector action tending to induce flow through said passage and for diverting a predetermined portion of said high velocity fluid flow in the form of a jet discharge having an injector action effective to oppose the injector action of said first jet discharge.

3. In fluid flow apparatus including a conduit in operative association with said apparatus and so related to said apparatus as to have a fluid flow in one direction developed therein resulting from the operation of said apparatus, the combination of wall means so arranged that under certain conditions of operation of the apparatus an injector action is effected tending to produce a flow through said conduit in the opposite direction.

4. In fluid flow apparatus including a conduit in operative association with said apparatus and so related to said apparatus as to have a suction produced at one end of the conduit resulting from the operation of the apparatus for drawing fluid through the conduit, the combination of flow control means so arranged that under certain conditions of operation of the apparatus a stream of fluid is delivered adjacent the other end of said conduit in such manner as to set up an injector action opposing the action of said suction.

5. In a fluid system having fluid receiving means, walls providing an opening for admitting fluid to said receiving means, and suction means operable for drawing fluid inwardly through said opening into said receiving means, the combination of walls defining an orifice subject at times to fluid currents external of said receiving means for conducting fluid to said opening, a passage for conducting fluid to said opening having its inlet communicating with the external fluid and its outlet communicating with said opening, and means for deflecting said external fluid currents to produce in proximity to said inlet a relatively high velocity fluid discharge operative to resist flow of fluid into said inlet and thereby to control the volume of fluid drawn into said receiving means through said opening by said suction means.

KENTON D. McMAHAN.